T. J. MAYALL.

Composition for the Manufacture of Emery Sticks and Wheels.

No. 1,289.

Reissued March 18, 1862.

Witnesses
Joseph Gavett
Albert H. Brown.

Inventor.
Thos J. Mayall.

UNITED STATES PATENT OFFICE.

THOMAS J. MAYALL, OF ROXBURY, MASSACHUSETTS, ASSIGNOR TO JOHN H. CHEEVER.

IMPROVED COMPOSITION FOR THE MANUFACTURE OF FLEXIBLE POLISHING STICKS AND WHEELS.

Specification forming part of Letters Patent No. 24,039, dated May 17, 1859; Reissue No. 1,289, dated March 18, 1862.

DIVISION B.

*To all whom it may concern:*

Be it known that I, THOMAS J. MAYALL, of Roxbury, in the county of Norfolk and State of Massachusetts, have invented a cernew and useful composition of matter or compound for the formation of wheels, sticks, and other like tools for grinding, cutting, and polishing metals, glass, and other hard substances; and I hereby declare that the following description, taken in connection with the accompanying drawings, hereinafter referred to, forms a full and exact specification of the same, wherein I have set forth the nature and principles of my improvements by which my invention may be distinguished from all others of a similar class, together with such parts as I claim and desire to have secured to me by Letters Patent.

Figure 2:
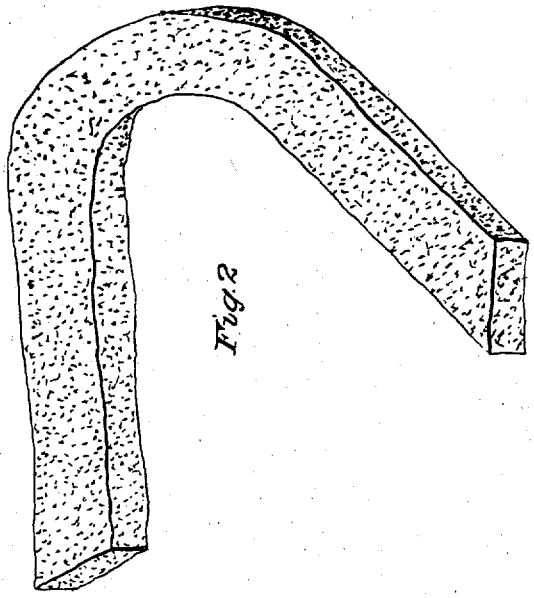
Figure 1:
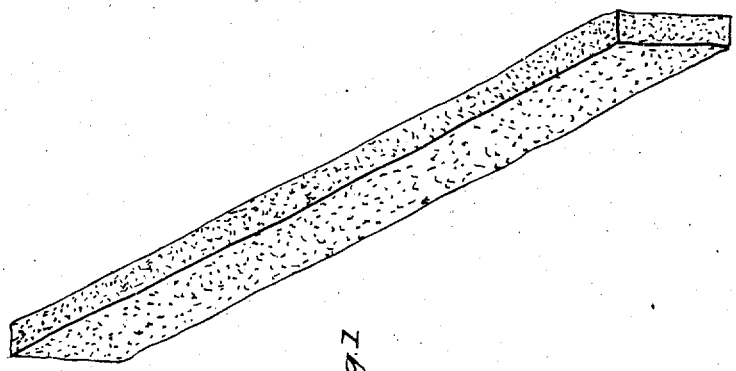

The figures of the accompanying plate of drawings represent my improvement, Figure 1 being a perspective view of a rigid emery stick; Fig. 2, that of a flexible emery stick.

I have heretofore made improvements in the manufacture of sticks, wheels, or other tools for cutting, grinding, and polishing metals, glass, and other hard substances, which consisted in the preparation of a compound by employing vulcanized rubber, tempered with olive-oil, in combination with powdered emery. Such compounds, on account of their extreme rigidity, have been found inconvenient for certain purposes. To obviate this I made numerous experiments which had for their object the production of a flexible india-rubber or gutta-percha compound having emery incorporated with it, and which, on account of its flexibility, would adapt itself to curved or unequal surfaces of the substance to be polished, and I have discovered a method of making emery sticks or other emery tools of india-rubber or gutta-percha compounds that are flexible, so that they may be used on any curved or unequal surface, and may be bent in using into any required shape. To illustrate this, my discovery or invention, I shall now proceed to describe a method whereby I have produced satisfactory results.

I take gutta-percha and purify it from the oil which is combined with it in its native state, and which is injurious to my composition, either by heating it to expel this oil or by any other method. I then combine it in the proportion of eight pounds of gutta-percha to four pounds of sulphur, and with this I mix forty pounds of powdered emery and half a pound of pure olive-oil. By this composition I am enabled to form a substance which combines with and holds the emery with the greatest firmness, and which can be molded and heated into any desired form. When these ingredients have been perfectly combined and mixed together, I place the composition in iron molds, and heat it from six to seven hours at a temperature of 260° Fahrenheit, when the composition acquires the consistency of thick sheet-lead, so that it can be bent by the hand, and then will remain in the position to which it is bent. I would here observe that I have found in this case, as in most processes of heating india-rubber and gutta-percha, that the heat must be varied very much, according to the materials used, and much must be left to the judgment of the workman, and I therefore do not limit myself to any particular degree of heat. The same result can be accomplished by heating the composition to a higher degree of temperature for a less time, and I have found that a heat of 300° Fahrenheit for two hours and a half will accomplish similar results. I produce similar flexible emery sticks and tools by using india-rubber instead of gutta-percha, and in that case I use a composition of one pound of india-rubber, five ounces of sulphur, five pounds of emery, and one ounce of pure olive-oil. This composition I heat for six hours at a temperature of 280° Fahrenheit or at a temperature of 300° Fahrenheit for two hours; but I do not limit myself to these degrees of heat or periods of time, as they admit of considerable variation, my object being to produce a flexible tool which can be bent into any desired form and will remain in the shape to which it is bent, and from the instructions hereinabove given any workman of ordinary skill can produce the compound of the desired consistency and degree of flexibility. It will be found that these tools can be bent more easily by holding them for a short time before a fire, and can be restored to their former shape in the same way.

The advantages of emery tools made of flexible india-rubber or gutta-percha compound are obvious. The sticks and tools can be made of any desired size or shape. A straight stick can be curved, so as to polish a shaft or the inside of a cylinder, or any oval surface, whereby a great saving of labor is accomplished.

I do not limit myself to the proportions of any of the compositions above described, as they will admit of considerable variation. I have given those which I have found most useful.

Having thus described my improvements, I claim—

1. As new articles of manufacture suitable to grinding and polishing metals, glass, &c., sticks and other tools made of a flexible india-rubber or gutta-percha compound having emery or other gritty substance incorporated with it.

2. As a new composition of matter, india-rubber or gutta-percha combined with sulphur and powdered emery, in the proportion and manner herein described, or in such other proportion and manner as will produce a flexible compound by vulcanization.

THOS. J. MAYALL.

Witnesses:
JOSEPH GAVETT,
A. W. BROWN.